R. T. COOKE.
POWER TRANSMISSION MECHANISM.
APPLICATION FILED NOV 11, 1920.
1,422,929. Patented July 18, 1922.
2 SHEETS—SHEET 1.
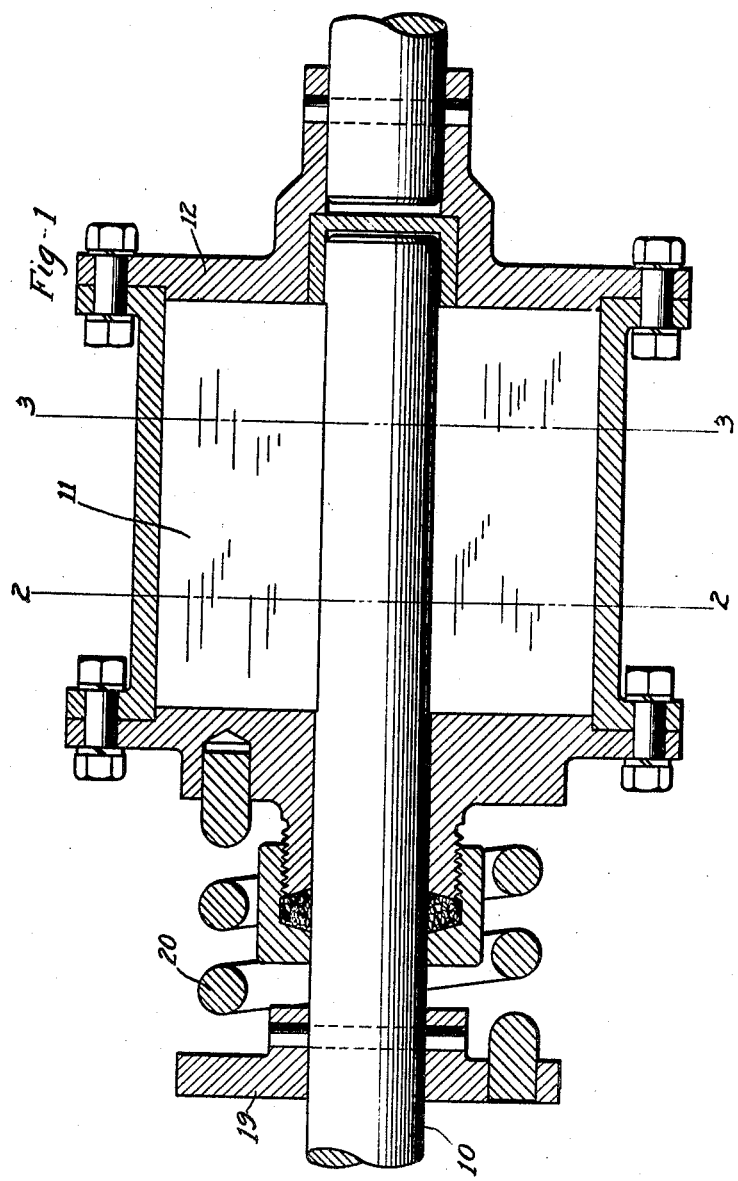
Inventor
Richard T. Cooke,
By Hood Schley
Attorney R. T. COOKE.
POWER TRANSMISSION MECHANISM.
APPLICATION FILED NOV. 11, 1920.
1,422,929.
Patented July 18, 1922.
2 SHEETS—SHEET 2.
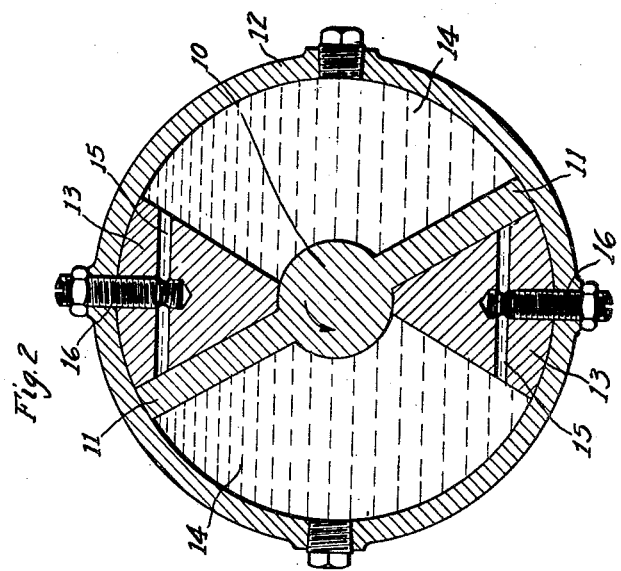
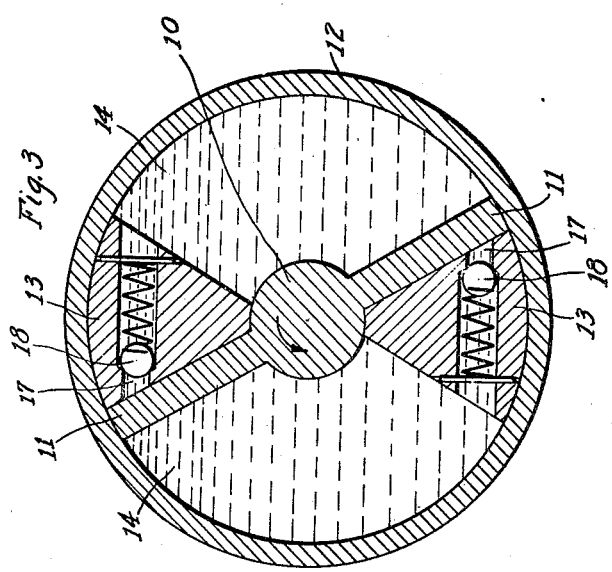
Inventor
Richard T. Cooke,
By Hood Schley
Attorneys

UNITED STATES PATENT OFFICE.

RICHARD T. COOKE, OF INDIANAPOLIS, INDIANA.

POWER-TRANSMISSION MECHANISM.

1,422,929.    Specification of Letters Patent.    Patented July 18, 1922.

Application filed November 11, 1920. Serial No. 423,314.

*To all whom it may concern:*

Be it known that I, RICHARD T. COOKE, a citizen of the United States, residing at Indianapolis, in the county of Marion and State of Indiana, have invented a new and useful Power-Transmission Mechanism, of which the following is a specification.

The object of my invention is to provide improvements in details of construction, in that type of mechanism which forms the subject-matter of my Patent No. 1,296,769, dated March 11, 1919, whereby the weights and loads will be balanced about the axis of the structure; the parts will return to normal position with greater promptness and under the force of a lighter spring.

The accompanying drawings illustrate my invention. Fig. 1 is an axial section of a device embodying my improvement; Fig. 2 a transverse section on line 2—2 of Fig. 1; and Fig. 3 a section on line 3—3 of Fig. 1.

In the drawings, 10 indicates a driven shaft which is provided with a pair of vanes 11, 11, balanced about the axis of shaft 10. Journaled upon shaft 10, and enclosing the vanes 11, is a casing 12 to be attached to, or connected with, a driven member. Casing 12 is provided with a pair of dams 13, 13 which project inwardly to shaft 10, said dams being diametrically opposed, so as to balance about the axis of shaft 10 and forming a pair of diametrically opposed chambers 14, 14, each of which contains one of the vanes 11 and is filled with a liquid, such, for instance, as lubricating oil.

Formed through each dam 13 is a passage 15 leading from one chamber 14 to the other, and the effective size of this passage may be varied by means of a screw 16 threaded through the casing 12 and into dam 13.

Also formed through each dam 13 is a passage 17 of larger diameter than passage 15. Each passage 17 is provided with a check valve 18 readily yielding to flow in one direction but restricting or preventing flow in the opposite direction.

Attached to shaft 10 is a collar 19 between which and casing 12 is arranged a torsion spring 20 which normally tends to bring the parts to the relative positions shown in Fig. 2, or at some position of the vanes 11 between the dams. The spring 20 is not of sufficient strength to start or carry the load under normal conditions, but yields under increased driving force so that the vanes 11 fairly promptly engage the dams 13.

In operation, the sudden application of a driving force to the driving member will drive a quantity of oil from one chamber to the other through passages 15, the speed of movement of vanes 11 in excess of the driven member 12 being determined by the adjustment of passages 15. As the driven member picks up speed, or as a shift of the transmission gears is accomplished; or as a clutch between the driven member and the ultimate load is released, the normal position of the parts will be promptly restored by spring 20, the valved passages 17 permitting a more rapid return of oil from one chamber to the other than would be permitted through the controlling passages 15.

I claim as my invention:

1. In a power transmission device, the combination of a driving member, a driven member, a receptacle carried by one of said members, balanced vanes carried by the other of said members and arranged within the said receptacle, balanced dams carried by and within the receptacle and cooperating with the vanes to permit a restricted flow, impelled by the vanes, from one portion of the chamber to another, means for permitting less-restricted reverse-flow impelled by the vanes from one portion of the chamber to another across the dams, and means for automatically angularly normalizing the driving and driven members.

2. In a power transmission device, the combination of a driving member, a driven member, a receptacle carried by one of said members, a vane carried by the other of said members and arranged within the said receptacle, a dam carried by and within the receptacle and cooperating with the vane to permit a restricted flow, impelled by the vane, from one portion of the chamber to another, means for permitting less-restricted reverse flow impelled by the vane from one portion of the chamber to another across the dam, and means for automatically angularly normalizing the driving and driven members.

3. In a power transmission device, the combination of a driving member, a driven member, a receptacle carried by one of said members, a plurality of balanced vanes carried by the other of said members and arranged within the driven receptacle, a plurality of balanced dams carried by and within the receptacle and dividing said receptacle into a plurality of compartments in which said balanced vanes operate, said dams cooperating with the vanes to permit a restricted flow impelled by the vanes from one compartment to the other, means for permitting less-restricted reverse flow impelled by the vanes from one compartment to the other, and means for automatically angularly normalizing the driving and driven members.

4. In a power transmission device, the combination of a driving member, a driven member, a receptacle carried by one of said members, balanced vanes carried by the other of said members and arranged within the receptacle, balanced dams carried by and within the receptacle and cooperating with the vanes to permit a restricted flow impelled by the vanes from one portion of the chamber to another, means for varying said restricted flow, means for permitting less-restricted reverse flow impelled by the vanes from one portion of the chamber to another across the dams, and means for automatically angularly normalizing the driving and driven members.

5. In a power transmission device, the combination of a driving member, a driven member, a receptacle carried by one of said members, a plurality of balanced vanes carried by the other of said members and arranged within said receptacle, a plurality of balanced dams carried by and within the receptacle and dividing said receptacle into a plurality of compartments, in each of which is arranged a vane, said vanes and dams cooperating to permit a restricted flow impelled by the vanes from one compartment of the chamber to another, means for varying said restricted flow, means for permitting a less-restricted reverse flow from one compartment to another impelled by the vanes, and means for automatically angularly normalizing the driving and driven members.

In witness whereof, I have hereunto set my hand at Hartford, Connecticut, this tenth day of November, A. D. one thousand nine hundred and twenty.

RICHARD T. COOKE.